(12) United States Patent
Chang et al.

(10) Patent No.: US 7,986,815 B2
(45) Date of Patent: Jul. 26, 2011

(54) SYSTEM AND METHOD OF PRODUCING LOCOMOTION ANIMATION BY USING RIDING MOTION

(75) Inventors: Sung June Chang, Daejeon (KR); Man Kyu Sung, Daejeon (KR); Byoung Tae Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 818 days.

(21) Appl. No.: 12/039,871

(22) Filed: Feb. 29, 2008

(65) Prior Publication Data

US 2009/0154772 A1    Jun. 18, 2009

(30) Foreign Application Priority Data

Dec. 15, 2007    (KR) .................. 10-2007-0131820

(51) Int. Cl.
*G06K 9/00*    (2006.01)
(52) U.S. Cl. ........ 382/107; 382/103; 382/153; 382/154; 706/15; 345/473
(58) Field of Classification Search .................. 382/103, 382/107, 153, 154; 706/15; 345/473
See application file for complete search history.

(56) References Cited

U.S. PATENT DOCUMENTS

| | | | | |
|---|---|---|---|---|
| 5,594,856 A | * | 1/1997 | Girard | 345/473 |
| 6,646,643 B2 | * | 11/2003 | Templeman | 345/473 |
| 6,708,142 B1 | | 3/2004 | Baillot et al. | |
| 7,181,434 B2 | * | 2/2007 | Lin et al. | 706/15 |
| 2006/0098014 A1 | | 5/2006 | Baek et al. | |

FOREIGN PATENT DOCUMENTS

| | | |
|---|---|---|
| JP | 2004-062692 | 2/2004 |
| KR | 10-2003-0056294 | 7/2003 |
| KR | 10-2006-0081498 | 7/2006 |
| KR | 10-0682849 | 2/2007 |

OTHER PUBLICATIONS

Notice of Allowance dated Oct. 22, 2009, for Korean application No. 10-2007-0131820, citing the above references.

* cited by examiner

*Primary Examiner* — Tom Y Lu
(74) *Attorney, Agent, or Firm* — Lowe Hauptman Ham & Berner LLP

(57) ABSTRACT

A method of producing a locomotion animation includes calculating movement information of the objects on the basis of surrounding information of the objects and motion capture data for the subjects, and measuring a collision between the objects or between an object and an obstacle on the basis of the movement information to calculate riding motion information for the subjects. The movement information and the riding motion information are then synthesized to determine movement motion and riding animations of the objects. Therefore, the motions of locomotion can be naturally connected with each other.

9 Claims, 2 Drawing Sheets

SYSTEM AND METHOD OF PRODUCING
LOCOMOTION ANIMATION BY USING
RIDING MOTION

FIELD OF THE INVENTION

The present invention relates to a system and method of producing a locomotion animation; and more particularly, to a system and method of producing a locomotion animation using a riding motion that is capable of producing a natural locomotion animation with no discontinuous portion at various distances and timing.

This work was supported by the IT R&D program of MIC/IITA [2007-S-051-01, Software Development for Digital Creature].

BACKGROUND OF THE INVENTION

In general, in producing a locomotion animation, a method that grasps surroundings so as to avoid a collision between objects within an animation and adjusts a speed and a direction of each object so as to avoid an obstacle including other objects is used. That is, obstacle avoidance method by the adjustment of the speed and direction is used.

As the method of producing the locomotion animation according to the related art, the obstacle avoidance method by the speed and direction adjustment has a problem in that, as the number of objects is larger, the obstacles that the objects have to avoid is increased in geometrical progression. For this reason, the positions that the objects can move may be severely limited, and accordingly natural locomotion may not be made along a desired motion line.

SUMMARY OF THE INVENTION

In view of the above, the present invention provides a system and method of producing a natural locomotion animation using a riding motion that is capable of being applied to various motion lines and timing.

In accordance with an aspect of the present invention, there is provided a method of producing a locomotion animation, which includes:

acquiring motion capture data for one or more objects;

calculating movement information of the objects on the basis of surrounding information of the objects and the motion capture data;

measuring a collision between the objects or between an object and an obstacle on the basis of the movement information to calculate riding motion information for the subjects; and synthesizing the movement information and the riding motion information to determine movement motion and riding animations of the objects.

In accordance with another aspect of the present invention, there is provided a system for producing a locomotion animation, which includes:

a movement information calculation unit for, on the basis of surrounding information of one or more objects and motion capture data for the subjects, calculating movement information of the objects;

a riding information calculation unit for measuring a collision between the objects or between an object and an obstacle on the basis of the movement information to calculate riding motion information of the subjects; and an animation calculation unit for synthesizing the movement information and the riding motion information to determine movement motion and riding animations.

BRIEF DESCRIPTION OF THE DRAWINGS

The above and other features of the present invention will become apparent from the following description of embodiments, given in conjunction with the accompanying drawings, in which.

DETAILED DESCRIPTION OF THE
EMBODIMENT

An exemplary embodiment of the present invention will now be described in detail with reference to the accompanying drawings.

Figure 1:
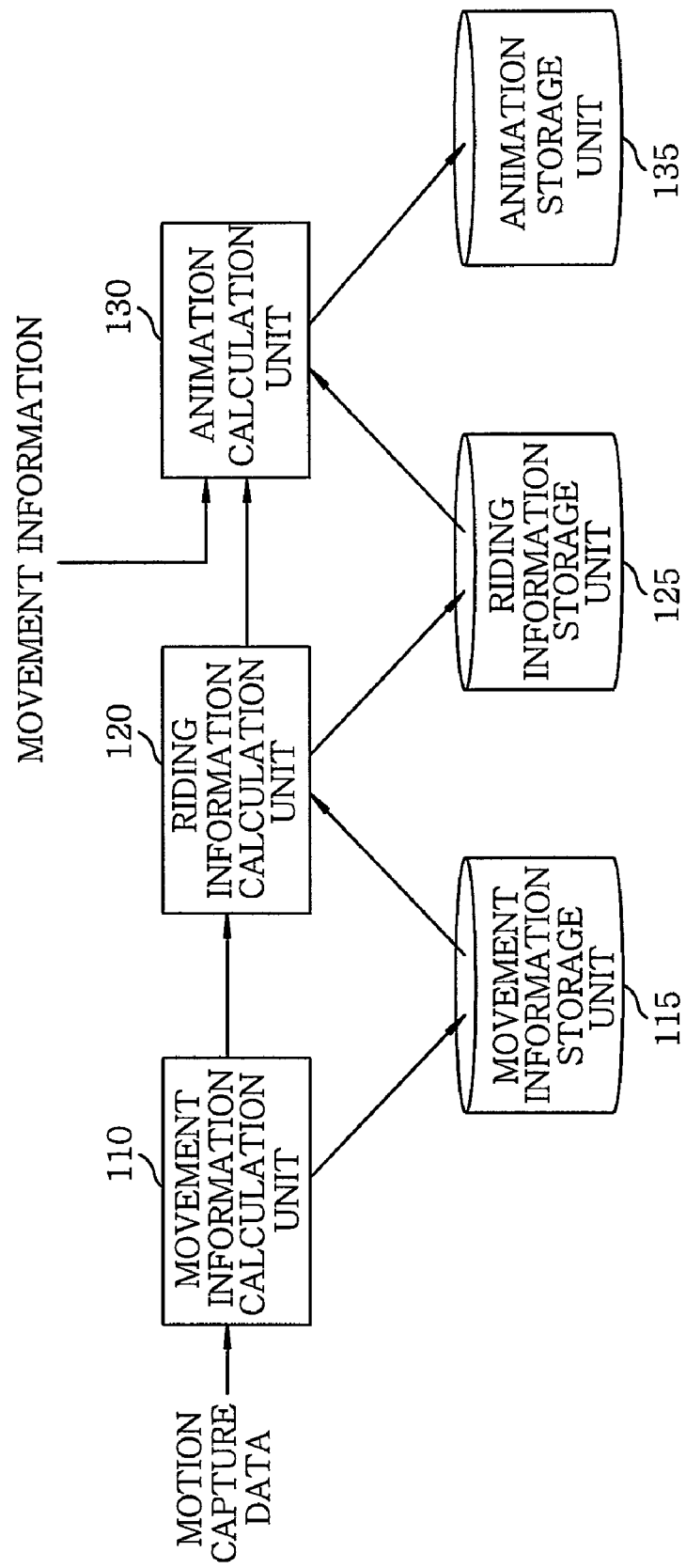
FIG. 1 is a block diagram showing a system for producing a locomotion animation using a riding motion according to an embodiment of the present invention.

FIG. 1 is a block diagram showing a system for producing a locomotion animation using a riding motion according to an embodiment of the present invention.

As shown in FIG. 1, a system for producing a locomotion animation according to an embodiment of the present invention includes: a movement information calculation unit 110 that calculates movement information of one or more objects on a basis of surrounding information of the objects and motion capture data for the objects; a movement information storage unit 115 that stores the movement information of the objects calculated by the movement information calculation unit 110; a riding information calculation unit 120 that measures a collision between the objects or between a target object and an obstacle including other objects on the basis of the movement information to calculate riding motion information of the target object; a riding information storage unit 125 that stores the riding motion information calculated by the riding information calculation unit 120; an animation calculation unit 130 that synthesizes the movement information and the riding motion information to determine movement motion and riding animations; and an animation storage unit 135 that stores the movement motion and riding animations determined by the animation calculation unit 130.

The movement information calculation unit 110 extracts individual environmental parameters required for movement motion of the objects on the basis of the surrounding information and the motion capture data of the objects. The environmental parameters include speed, direction, intrinsic status and the like of the objects necessary to adapt the movement motion to the objects or to make the objects to comply with environment. The motion capture data is obtained from a motion capture system (not shown) in which sensors are attached on a real object and motion images of the real object are captured. Furthermore, the movement information calculation unit 110 generates individual movement motion as the movement information of the objects on the basis of the extracted individual environmental parameters. The movement information of the objects is stored in the movement information storage unit 115.

The riding information calculation unit 120 directly or indirectly calculates an overlap region that indicates the collision between the objects or between a target object and the obstacle. Furthermore, the riding information calculation unit 120 calculates an angle and a height required for riding of the target object on the basis of the overlap region to calculate the riding motion information. The riding motion information is stored in the riding information storage unit 125.

The animation calculation unit 130 synthesizes the movement information stored in the movement information storage unit 115 and the riding motion information stored in the riding information storage unit 125 to determine (or calculate) the movement motion and riding animations. The information on the determined movement motion and riding animations is recorded in the animation storage unit 135.

Figure 2:
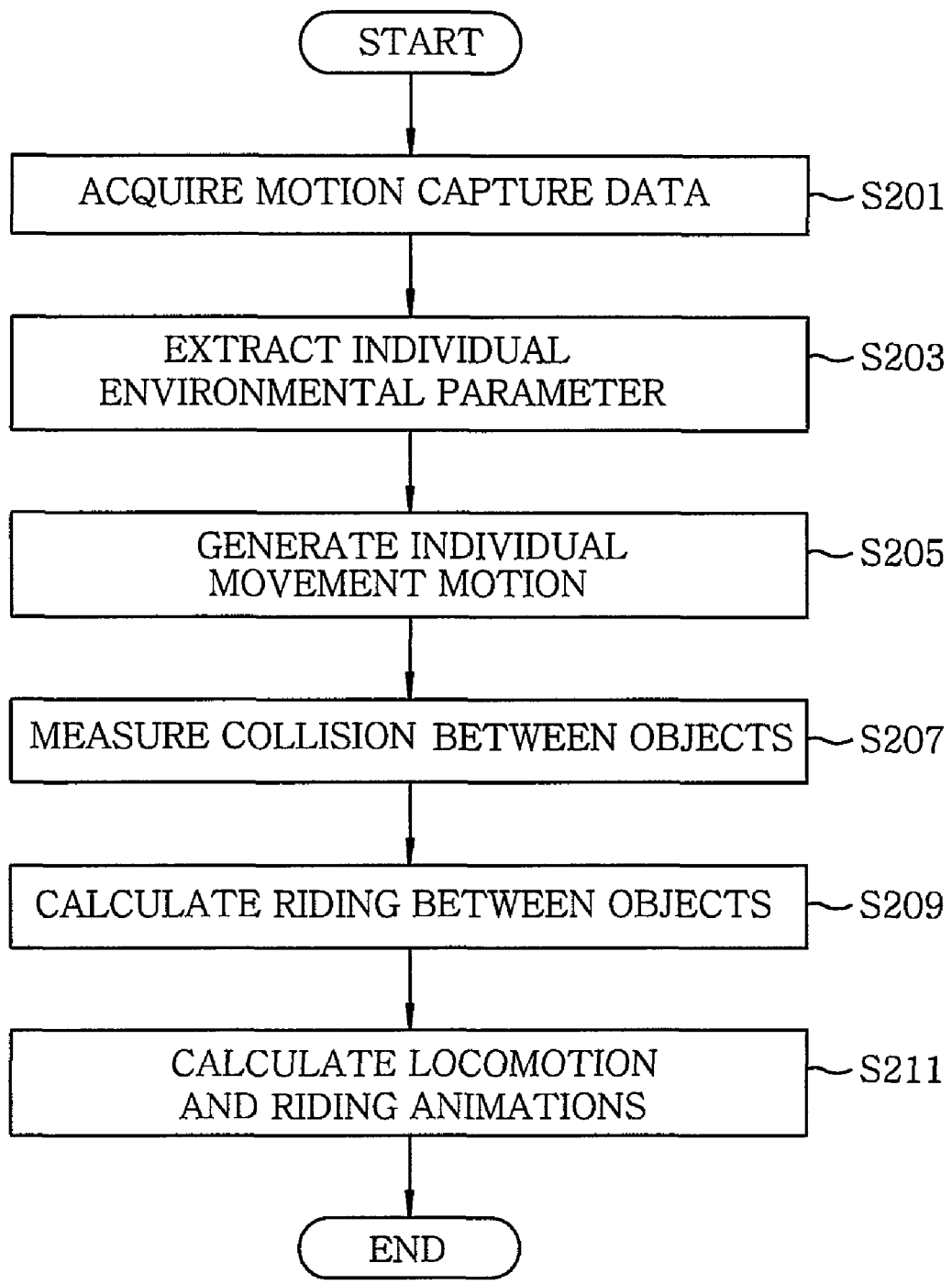
FIG. 2 is a flowchart illustrating a method of producing a locomotion animation using a riding motion according to an embodiment of the present invention.

FIG. 2 is a flowchart illustrating a method of producing a locomotion animation using a riding motion according to an embodiment of the present invention.

As shown in FIG. 2, a method of producing a locomotion animation according to an embodiment of the present invention includes the steps of: calculating movement information of one or more objects on the basis of surrounding information of the objects and motion capture data for the objects (steps S201 to S205); measuring an overlap region between the objects or between a target object and an obstacle including other objects on the basis of the movement information of the objects to calculate riding motion information of the target object (steps S207 to S209); and synthesizing the movement information and the riding motion information of the target object to calculate movement motion and riding animations of the target object (step S211).

In the step of calculating the movement information of the objects (steps S201 to S205), the motion capture data for the objects is acquired (step S201), and individual environmental parameter required for the movement motion of the objects is extracted on the basis of the surrounding information and the motion capture data (step S203). After that, individual movement motion is calculated as the movement information of the objects on the basis of the individual environmental parameters of the objects (step S205).

In the step of calculating the riding motion information (steps S207 to S209), an overlap region between the objects or between a target object and an obstacle including other objects is directly or indirectly calculated (step S207), and an angle and a height required for riding of the target object is calculated on the basis of the calculated overlap region to thereby generate the riding motion information of the target object (step S209).

In the step of synthesizing the movement information and the riding motion information of the target object, the movement motion and riding animations of the target object is calculated (step S211).

A process of producing a locomotion animation according to the system and method as described above will now be described.

First, the motion capture data for the objects is acquired and is provided to the movement information calculation unit 110 (step S201). Next, the movement information calculation unit 110 acquires surrounding information on obstacles including the objects, and calculates necessary motion lines of the objects, to thereby extract individual environmental parameters required for movement motion of the objects (step S203). The individual environmental parameters calculated by the movement information calculation unit 110 are stored in the movement information storage unit 115.

In addition, the movement information calculation unit 110 generates movement motion of the objects on the basis of the individual environmental parameters (step S205). Information on the generated movement motion is stored in the movement information storage unit 115.

The riding information calculation unit 120 calculates a collision between the objects or between a target object and the obstacle by using the movement motion stored in the movement information storage unit 115, and at the same time, directly or indirectly calculates an overlap region that indicates a degree of the collision (step S207). The information on the collision and the overlap region are stored in the riding information storage unit 125.

The riding information calculation unit 120 determines, on the basis of the information on the collision and the overlap region, whether or not to make riding, determines which object or obstacle makes the riding, and determines an angle and a height required for the riding (step S209). The information on the results determined by the riding information calculation unit 120 is stored in the riding information storage unit 125.

The animation calculation unit 130 synthesizes the movement information from the movement information storage unit 115 and the riding information from the riding information storage unit 125 to determine (calculate) the movement motion and riding animations (step S211). The information on the determined movement motion and riding animations is stored in the animation storage unit 135.

In a locomotion animation that is produced on the basis of the movement motion and riding animations, the collision can be resolved by riding while being free from the motion lines required for existing obstacle avoidance. Therefore, the motions of locomotion can be naturally connected with each other. In addition, it can be applied at a predetermined distance and a predetermined time, which results in excellent expansiveness.

According to the present invention, two-dimensional natural locomotion is calculated, and the collision at that time is resolved by calculating the riding motion. Then, the motions of locomotion are naturally connected with each other. Therefore, a locomotion animation that meets demands for various motion lines and time can be produced.

The method of producing a locomotion animation using a riding motion according to the embodiment of the present invention may be implemented with a computer-readable program that is stored in a recording medium (CD-ROM, RAM, ROM, floppy disk, hard disk, or magneto-optical disk).

While the invention has been shown and described with respect to the preferred embodiments, it will be understood by those skilled in the art that various changes and modifications may be made without departing from the scope of the invention as defined in the following claims.

What is claimed is:

1. A method of producing a locomotion animation, the method comprising the steps of:
   acquiring motion capture data for one or more objects;
   calculating movement information of the objects on the basis of surrounding information of the objects and the motion capture data;
   measuring a collision between the objects or between a target object and obstacles including the objects on the basis of the movement information to calculate riding motion information for the target subject; and
   synthesizing the movement information and the riding motion information to determine movement motion and riding animations of the target object.

2. The method of claim 1, wherein the step of calculating the motion information includes:
   extracting individual environmental parameters required for movement motion of the objects on the basis of the surrounding information and the motion capture data; and
   generating individual movement motion using the individual environmental parameters to calculate the movement information.

3. The method of claim 1, wherein the step of calculating the riding motion information comprises calculating an overlap region between the objects or between the target object and the obstacles, and determining whether or not to make riding and which object or obstacle makes riding on the basis of the calculated overlap region.

4. The method of claim 3, wherein the step of calculating the riding motion information includes calculating an angle and a height required for the riding on the basis of the overlap region.

5. A system for producing a locomotion animation, the system comprising:
- a movement information calculation unit for, on the basis of surrounding information of one or more objects and motion capture data for the subjects, calculating movement information of the objects;
- a riding information calculation unit for measuring a collision between the objects or between a target object and obstacles including the objects on the basis of the movement information to calculate riding motion information of the subjects; and
- an animation calculation unit for synthesizing the movement information and the riding motion information to determine movement motion and riding animations.

6. The system of claim 5, further comprising:
- a movement information storage unit for storing the movement information calculated by the movement information calculation unit;
- a riding information storage unit for storing the riding motion information calculated by the riding information calculation unit; and
- an animation storage unit for storing the movement motion and riding animations determined by the animation calculation unit.

7. The system of claim 5, wherein the movement information calculation unit extracts individual environmental parameters required for movement motion on the basis of the surrounding information and the motion capture data, and generates individual movement motion using the individual environmental parameters to calculate the movement information.

8. The system of claim 5, wherein the riding information calculation unit calculates an overlap region between the objects or between the object and the obstacle, and determines whether or not to make riding and which object or obstacle makes riding on the basis of the calculated overlap region.

9. The system of claim 8, wherein the riding information calculation unit calculates an angle and a height required for the riding on the basis of the overlap region.

* * * * *